No. 874,868. PATENTED DEC. 24, 1907.
S. ROTHSCHILD.
TELAUTOPHOTE.
APPLICATION FILED SEPT. 6, 1906.
5 SHEETS—SHEET 2.
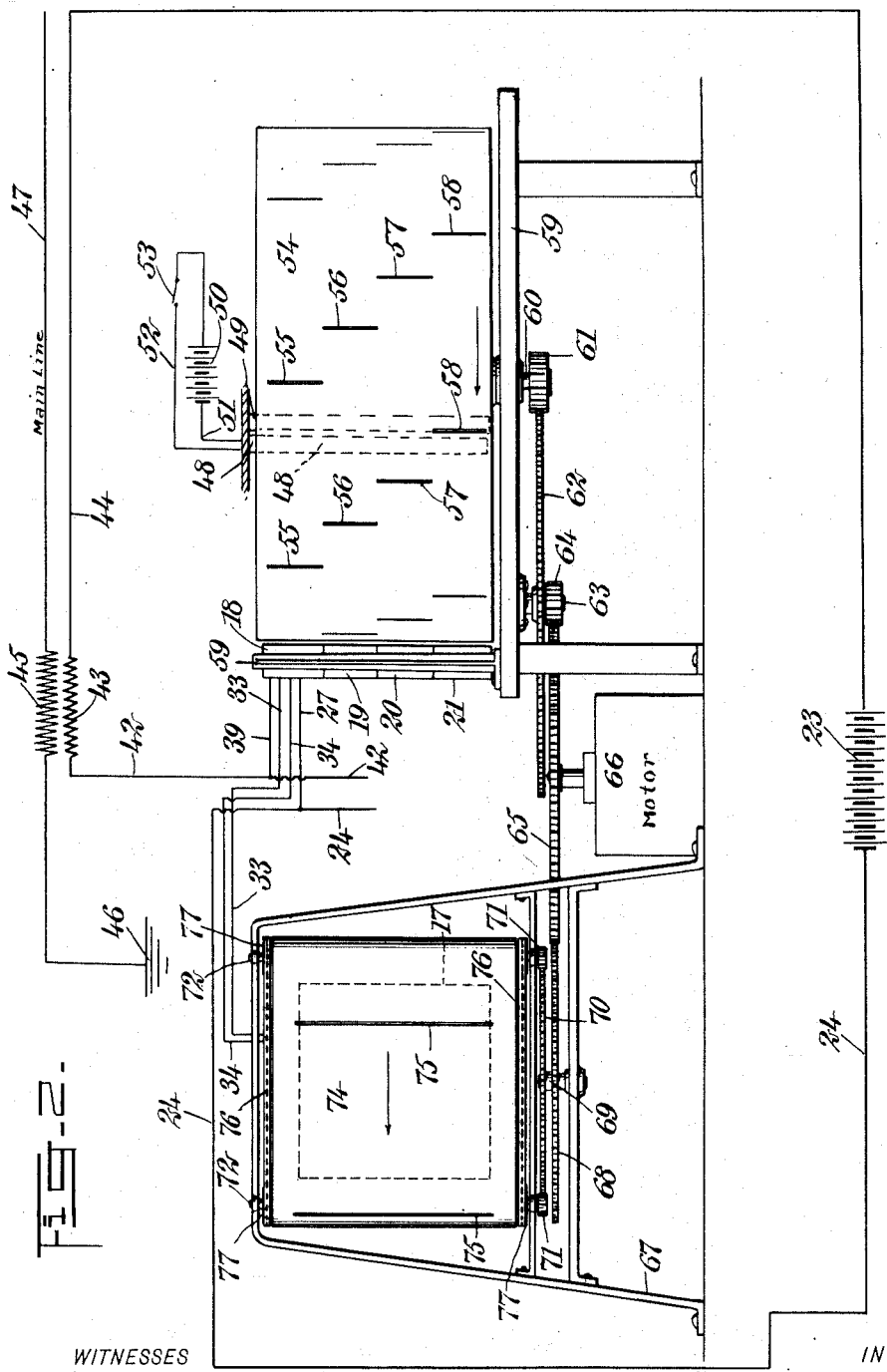
WITNESSES
INVENTOR
Sidney Rothschild
BY
ATTORNEYS

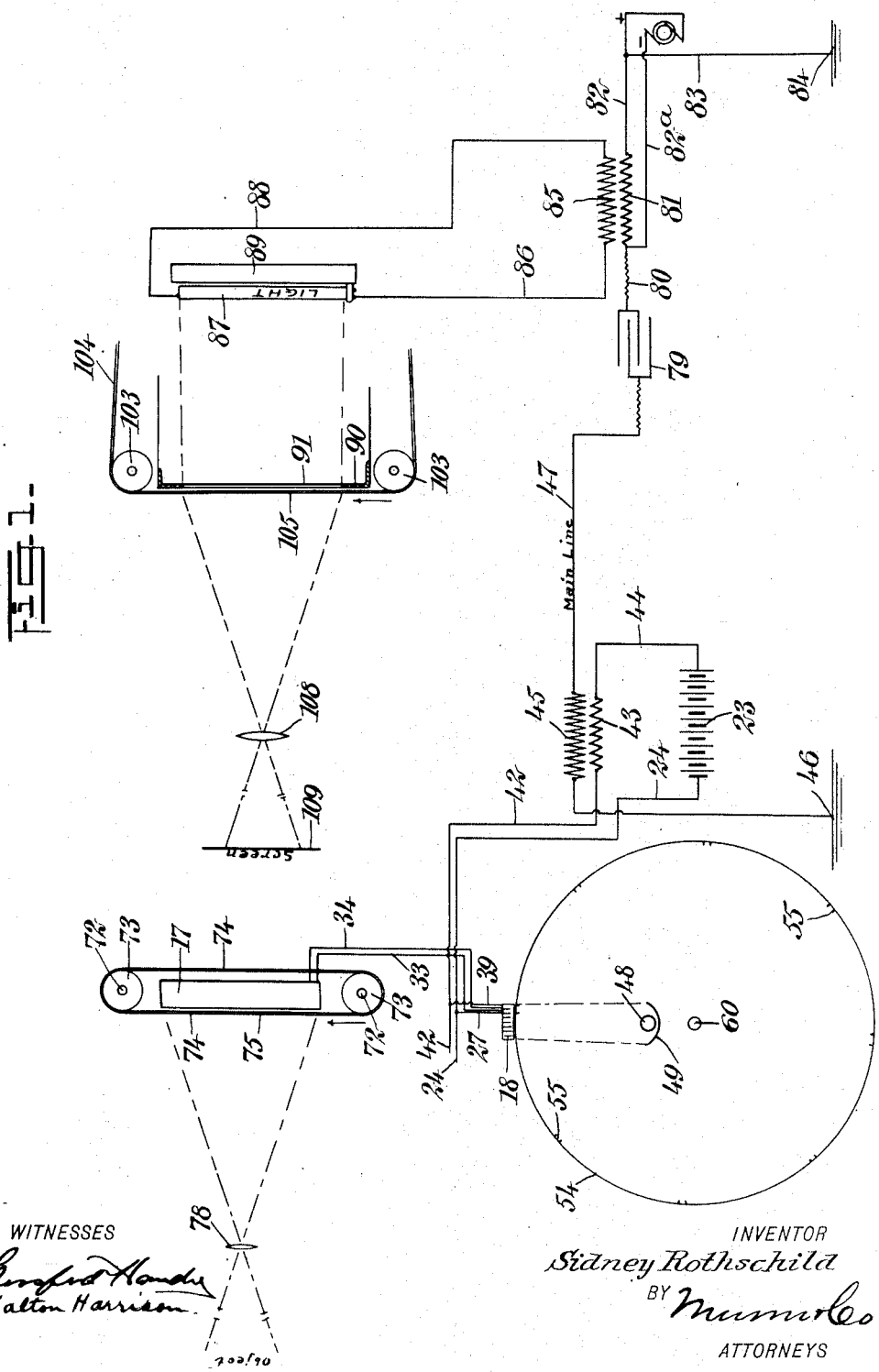

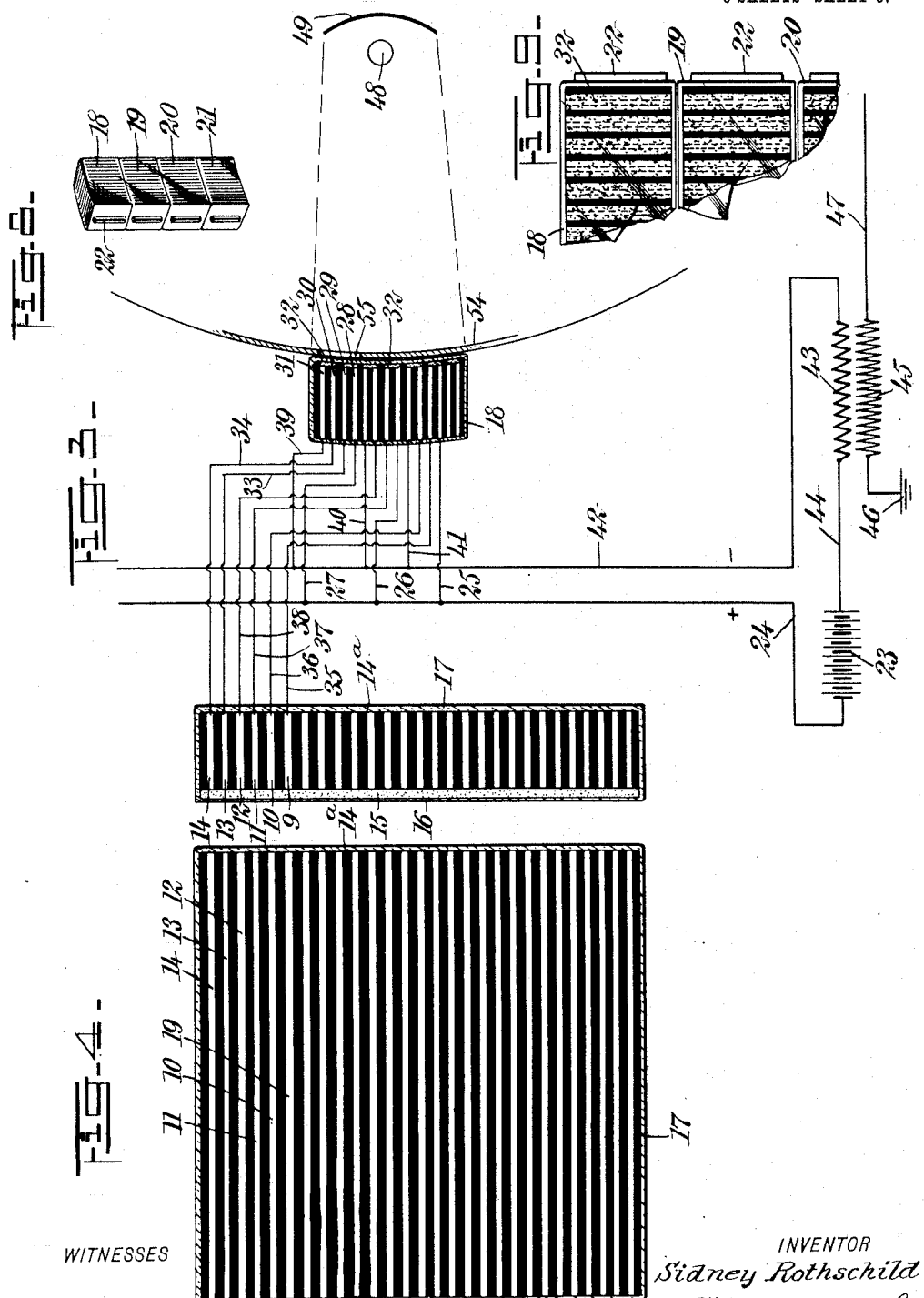

No. 874,868. PATENTED DEC. 24, 1907.
S. ROTHSCHILD.
TELAUTOPHOTE.
APPLICATION FILED SEPT. 6, 1906.
5 SHEETS—SHEET 4.
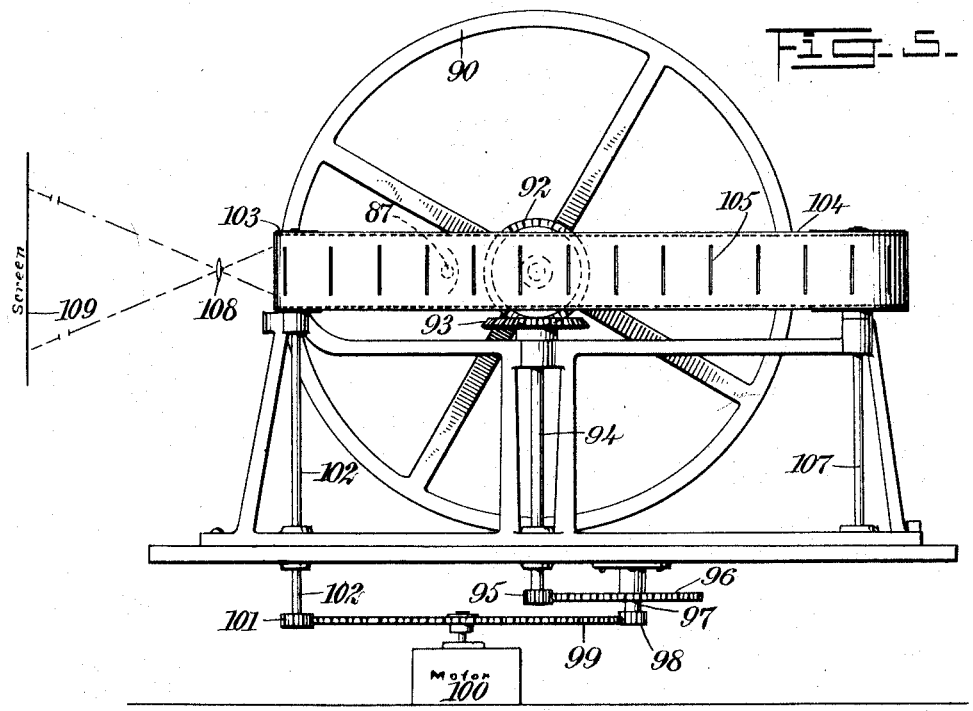
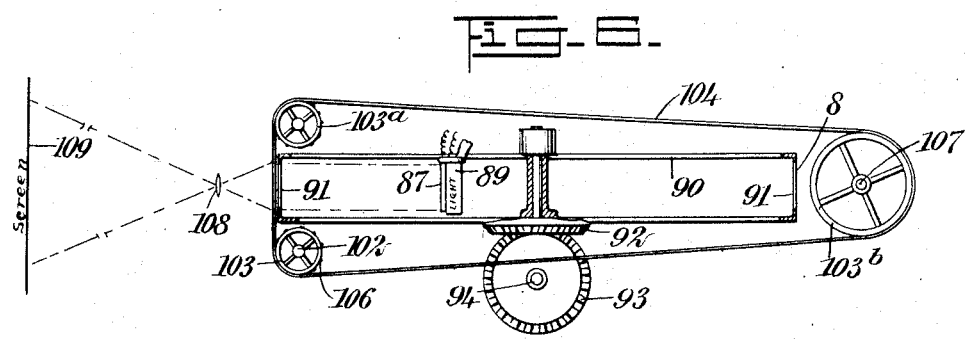
WITNESSES
INVENTOR
Sidney Rothschild
BY
ATTORNEYS No. 874,868. PATENTED DEC. 24, 1907.
S. ROTHSCHILD.
TELAUTOPHOTE.
APPLICATION FILED SEPT. 6, 1906.
5 SHEETS—SHEET 5.
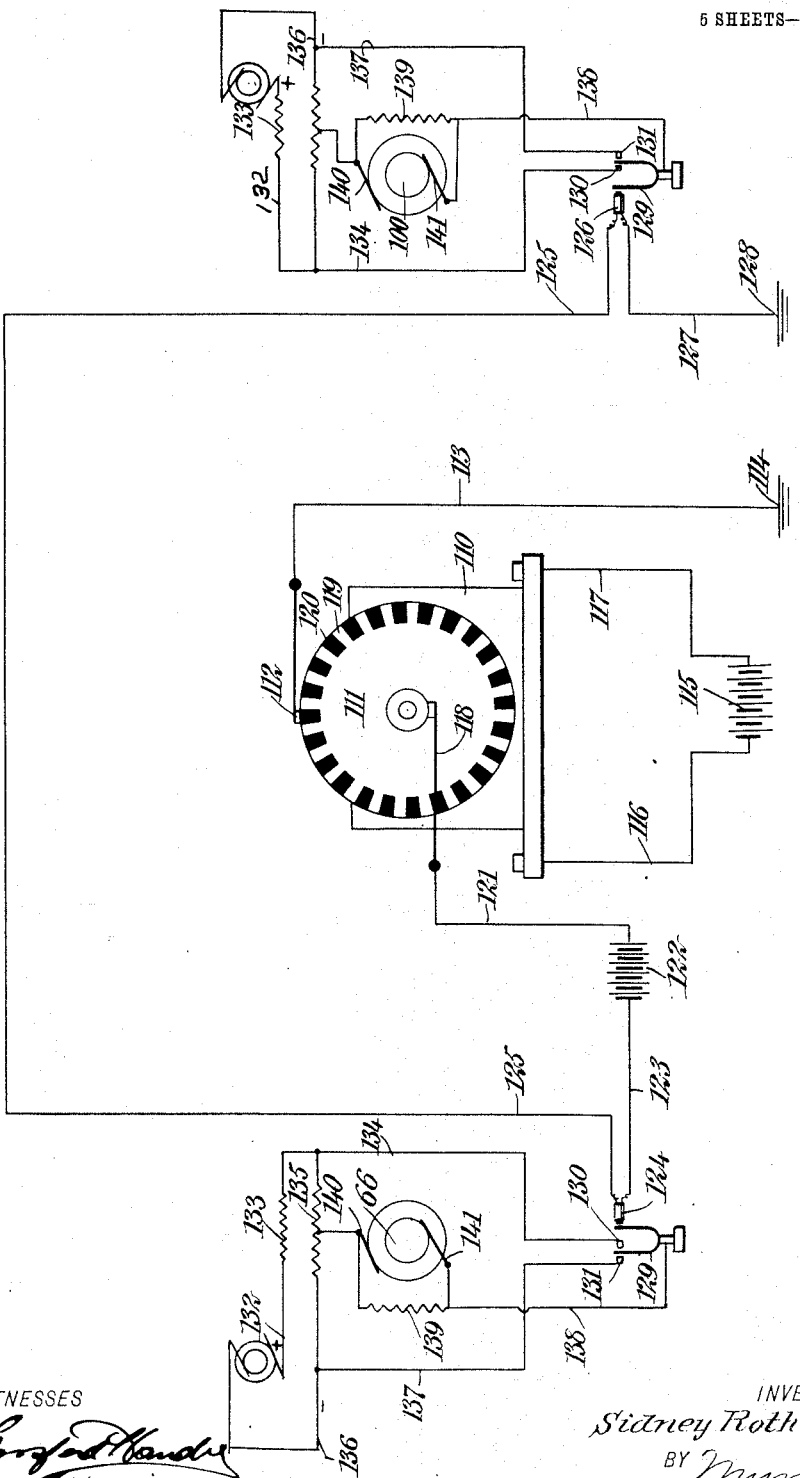
WITNESSES
INVENTOR
Sidney Rothschild
BY
ATTORNEYS

UNITED STATES PATENT OFFICE.

SIDNEY ROTHSCHILD, OF NEW YORK, N. Y.

TELAUTOPHOTE.

No. 874,868.      Specification of Letters Patent.      Patented Dec. 24, 1907.

Application filed September 6, 1906. Serial No. 333,423.

*To all whom it may concern:*

Be it known that I, SIDNEY ROTHSCHILD, a citizen of the United States, and a resident of the city of New York, borough of Manhattan, in the county and State of New York, have invented a new and Improved Telautophote, of which the following is a full, clear, and exact description.

My invention relates to the transmission of images by electricity, my more particular object being to provide for this purpose an efficient apparatus possessing certain constructional advantages hereinafter described, the apparatus using a single wire for connecting together the receiving and sending stations.

Briefly summarized, my invention consists in causing a light-controlled composite background to vary the intensity of electrical currents flowing over a wire, and causing these currents to control the intensity of a light at the receiving station, this light being caused by appropriate mechanism to produce a moving luminous spot of varying intensity in such manner as to reproduce a fac-simile of an image disposed adjacent to the aforesaid background at the transmitting station.

Reference is to be had to the accompanying drawings forming a part of this specification, in which similar characters of reference indicate corresponding parts in all the figures.

Figure 1 is a diagram showing the optical and electrical equipment of the system, including both the transmitting and receiving stations; Fig. 2 is a side elevation of the mechanism used at the sending station, and shows in diagram a part of the wiring; Fig. 3 is an enlarged section, partly diagrammatic, showing the portion of the mechanism employed at the transmitting station, and especially the light-controlled background and the light-controlled switch for affecting the flow of currents relatively to this background, and also showing in diagram a part of the wiring; Fig. 4 is a front elevation of the light-controlled background, the selenium fuse thereof being removed; Fig. 5 is a side elevation of the principal apparatus used at the receiving station and provided with means for projecting upon the screen the image transmitted to this station; Fig. 6 is a central vertical section through the mechanism shown in Fig. 5, and showing particularly the arrangement of the slotted wheel and slotted belt for controlling the direction of the light projected for producing the images; Fig. 7 is a diagram of the synchronizing system and of the electric motors controlled thereby and located at the sending and receiving stations for the purpose of propelling and maintaining in unison the members wherein certain parts are located respectively at these stations; Fig. 8 is a perspective view of the selenium cell employed in the light-controlled switch at the sending station, this cell being made in sections; and Fig. 9 is a fragmentary front elevation of the upper right corner of the selenium cell shown in Fig. 8 and showing how the sections are assembled.

A number of metallic strips 9, 10, 11, 12, 13 and 14, preferably of tin-foil, copper, brass, platinum, or other metal commonly used in photophones, are separated from each other by strips 14$^a$ of insulating material, and a coating 15 of selenium is applied over the surface thus formed by contiguous edges of the strips as will be understood from Fig. 3. The selenium coating 15 after being applied in a vitreous state is baked and otherwise treated so as to render it sensitive to light in the manner well understood with reference to the preparation of light-controlled selenium cells. A pane of glass 16 is connected integrally with the casing 17 of the same material and serves to protect the selenium coating from the action of the atmosphere.

The selenium cell as a whole is shown in Fig. 4 and in the left hand portion of Fig. 3. The strips 10 to 14 inclusive, and insulating strips 14$^a$ therebetween, are of such thickness that the metallic strips make about one hundred and fifty to the inch. The selenium cell just described is used as a background for receiving light from the object, the image of which is to be transmitted.

Another selenium cell is shown in Fig. 8, and is built up of sections 18, 19, 20 and 21, each having a sector-like form and provided upon its opposite ends with tongues 22 for conveniently mounting it in position. A battery 23 is situated at the transmitting station, and from this battery a wire 24 is connected with a number of branching wires 25, 26, 27, arranged in parallel with each other as will be understood from Fig. 3. Each of these wires is connected with a metallic strip, such as 28, forming a part of the selenium cell shown in Fig. 8 and also in the center of Fig. 3. Other metallic strips 29, 30 and 31 are incorporated in this cell, each consecutive pair of strips such as 28, 29, or 30, 31, being connected together by a coating 32 of selenium. This coating has the form of a comparatively narrow bar. All of the metallic strips in this selenium cell are insulated from each other as will be understood from Fig. 3. Wires 33, 34 are connected with the strips 13, 14. The wire 33 connects with the strip 29 and the wire 34 with the strip 30. Since the strips 30, 31 are paired together and connected at their faces by the same coating 32, and since the strips 28, 29 are similarly connected by another coating 32, it follows that the wires 33, 34 connect with different pairs of strips of the selenium cell shown at the right of Fig. 3. The purpose of this arrangement is hereinafter explained. Wires 35, 36, 37 and 38 are each connected with the metallic strips 9, 10, 11 and 12 and with a pair of the contact strips in the other selenium cell shown in Fig. 8 and in the middle of Fig. 3. One contact strip in each pair of this cell (for instance the contact strip 31) is connected by a wire 39, 40 or 41 in parallel with a wire 42 which is connected with a primary winding 43, and this is in communication by a wire 44 with the battery 23. A secondary winding 45 is disposed in inductance relation to the primary winding 43 and is grounded at 46. The line wire is shown at 47 and is connected with the secondary winding 45.

The selenium cell shown in Fig. 8 and at the center of Fig. 3 is illuminated over a small portion of its surface at a time by means of a vacuum tube 48 which is provided with a reflector 49. The vacuum tube 48 may be a Geissler tube, a mercury vapor tube, or any other tube through which currents are sent for the purpose of causing a glow to take place. At the transmitting station (see Fig. 2) is a source of electricity 50 for energizing the vacuum tube 48. This source of electricity is conventionally shown as a battery, but may be a dynamo supplying direct or alternating current, or may be any equivalent machine or instrument for generating currents of the character suitable for illuminating the tube 48. Since the purpose of the vacuum tube 48 is merely to produce a light, it is obvious that I do not limit myself to the employment of a vacuum tube for this purpose. A source of electricity 50 is connected with the tube 48 by a wire 51. From this tube a wire 52 leads back to the battery 50. A hand switch 53 may be used for opening and closing the circuit from the battery. A revoluble cylinder 54 is provided with a series of slots 55, 56, 57, 58, each being adapted to register with one of the sections 18, 19, 20 and 21 of the selenium cell shown in Fig. 8. The slots 55 to 58 inclusive are staggered relatively to each other and so disposed that only one of them at a time is in communication with one of the sections 18 to 21 inclusive. For instance, when a slot 55 is allowing light to shine upon a section 18 the other sections are all dark, and when the next slot 56 throws light upon the section 19, the said section is the only one receiving any illumination. The slots are disposed vertically and are comparatively narrow so as to expose only one pair of coatings 32 of each section at a time, as will be understood from Fig. 3. The revoluble cylinder 54 is supported by a frame 59 and is turned by a shaft 60 provided with a pinion 61 which meshes with a gear wheel 62. The latter is mounted upon a stub shaft 63, carrying a pinion 64, and the latter meshes with a gear wheel 65 of the motor 66. This motor at the transmitting station is synchronized with another motor at the receiving station as hereinafter described.

Revolubly mounted upon a framework 67 is a gear wheel 68 which meshes with the gear wheel 65. The gear wheel 68 is connected by a stub shaft 69 with a gear wheel 70, and the latter meshes with pinions 71 mounted upon revoluble shafts 72. Carried by these shafts are rollers 73, and running upon these rollers is a comparatively wide belt 74 provided with longitudinal slots 75 disposed crosswise of the belt which travels in the direction indicated by the arrow in Fig. 2. Sprocket chains 76 running upon sprocket wheels 77 gear the shafts 72 and the rollers 73 mounted thereupon in such manner as to cause the same to move positively. Each slot 75 is of a length substantially equal to the height of the selenium cell shown in Fig. 4. A lens 78 or equivalent objective glass is disposed in front of the selenium cell 17 and is adapted to throw upon the same a fac-simile of the object, the image of which is to be transmitted, as will be understood from the diagram at the left of Fig. 1.

The line wire 47 is provided with a condenser 79 and connected with this condenser at a point near the receiving station is a wire 80 constituting a continuation of the main line wire. This wire 80 is connected with a primary winding 81 and with a wire 82. From the last mentioned wire a wire 83 is connected with the ground at 84. A wire 82ª is connected with the wire 80. A secondary winding 85, disposed in inductive relation to the primary winding 81, is connected by a wire 86 with an electric lamp 87. This electric lamp may be a vacuum tube of the kind above described, or may be a so-called Nernst lamp. A wire 88 connects its upper end with the secondary winding 85. The wires 82, 82ª are connected with a source of electric current, preferably alternating, so as to light up the lamp 87. If an alternating current is used it should preferably be of high frequency, but this is not in all cases necessary, for the reason that the glow of the tube does not diminish materially between successive alternations of the current unless the current be of exceedingly low frequency. The glow from the lamp 87 should be normally continuous and constant, or at least practically so, and this result is easily attained. A revoluble wheel 90 is provided with slots 91 and is turned at a comparatively high speed by means of bevel gears 92, 93, the bevel gear 93 being rigid upon a revoluble shaft 94. Mounted upon the lower end of this shaft is a pinion 95 which meshes with a gear wheel 96. The latter is mounted upon a stub shaft 97 carrying a pinion 98, and the latter meshes with a large gear 99 propelled by a motor 100. A pinion 101 carried by a shaft 102 transmits motion from the gear wheel 99 to a roller 103. A belt 104 engages this roller and is provided with vertically-disposed slots 105. These slots pass over the face of the wheel 90. Rollers 103ª and 103ᵇ also engage the belt 104. The rollers 103 and 103ª are provided with projections 106 for preventing the belt 104 from slipping and for generally maintaining it in a positive working relation to the rollers. A lens 108, or equivalent objective, is used for the purpose of defining an image upon a screen 109 as will be understood from Fig. 5.

The motor 66 at the transmitting station and the motor 100 at the receiving station are partly electrical and partly mechanical, being made in accordance with wellknown principles. These motors do not differ essentially from others heretofore in use. Such being the case, their electrical connections are shown diagrammatically as will be seen from Fig. 7. An electric motor 110 is provided with a revoluble disk 111 engaging a stationary brush 112 which is connected by a wire 113 with the ground at 114. A battery 115 is connected by wires 116, 117 with the motor 110 for the purpose of turning the revoluble disk 111. A brush 118 is in electrical communication with the disk 111, which is of conducting material, preferably metal, and is provided with teeth 119 of the same material and separated from each other by spaces 120 filled with insulating material. Teeth of this kind are not apt to spark and break the electrical connection positively and precisely. A wire 121 connects the brush 118 with a battery 122. The motor 110, battery 115 and battery 122 may be located at any convenient point along the line. The battery 122 is connected by a wire 123 with an electro-magnet 124 at the transmitting station. A wire 125 leads from this electro-magnet to another electro-magnet 126, which is located at the receiving station and is connected by a wire 127 to the ground at 128. Vibratory forks 129 are disposed opposite the magnets 124 and 126 and are adapted to open and close the contacts 130 and 131 when energized and deënergized by the magnets 124. At each station a supply wire 132 for direct current is provided with a resistance 133 and is connected by a wire 134 with the contact 138. A resistance 135 is connected with another supply wire 136. Each pair of wires 132 and 136 represents a positive and a negative lead. A wire 137 connects a contact point 131 with the wire 136. Connected with each tuning fork 129 is a wire 138 which is connected with a resistance 139 shunted across the brushes 140, 141 of the motors 66 or 100.

When the motor 110 causes the disk 111 to rotate the teeth 119 engage and disengage the brush 112 and current is sent over the synchronizing line shown in Fig. 7, the circuit being as follows:—Battery 122, wire 121, brush 118, disk 111, brush 112, wire 113, ground at 114, ground at 128 of the receiving station, wire 127, electro-magnet 126, wire 125 to transmitting station, electro-magnet 124 at the transmitting station, and wire 123 back to the battery 122. The forks 129, one located at the receiving station and the other at the transmitting station, are attracted and released by the electro-magnets 126 and are thus caused to vibrate in unison. In vibrating each fork makes and breaks contact with the contact point 130 and also with the contact point 131.

When the fork 129 is in communication with the contact 130 the course of the current is as follows: Wire 132, resistance 133, wire 134, contact point 130, fork 129, wire 138, noninductive resistance 139, which impedes its direction, thence branching off through brushes 141, motors 60 and 100, brush 140, resistance 135 and wire 136 back to the source of energy.

When the fork 129 engages the contact point 131 the circuit is as follows: Wire 132, resistance 133, part of resistance 135, non-inductive resistance 139, brush 140, motor 66 or 100, brush 141, wire 138, fork 129, contact point 131, wire 137, and wire 136 back to the source of supply. The vibratory forks 129 thus supply current to their respective motors 66 and 100 in such manner that these motors are energized synchronously and thus serve to synchronize the movable parts actuated thereby.

Inasmuch as the details of the synchronizing mechanism form no part of my invention I will not describe them in detail, but they can be found in any standard work relating to the general subject of electrical synchronizing.

The speed of the wheel 90 is very high as compared with the speed of the cylinder 54 and the belt 74. The speed of the belt 74 should be so high that one of the slots 105 moves across the face of the selenium cell 17 shown in Fig. 4 in one-fifth of a second or less. The cylinder 54 should be of such speed that one of the slots 55, 56 or 57, 58 passes over the face of a section 18, 19, 20 and 21 in one-twelve-thousandth part of a second. This would correspond to a speed of twenty-two thousand five hundred revolutions per minute for the cylinder 54 and this would represent seven hundred and twenty thousand flashes per minute. It is essential that the speed of the cylinder 54 be high as compared with that of the belt 74. It necessarily follows from the electrical connections shown in Fig. 2 and elsewhere that when the successive slots 55, 56, 57 and 58 travel successively past the respective sections 18, 19, 20 and 21 as above described, the conducting strips 9, 10, 11, 12, 13 and 14 are all successively energized from top to bottom of the selenium cell shown in Fig. 4. That is to say, strip No. 14 is first energized, then strip No. 13, next strip No. 12, and so on down through the entire series, the bottom strip being energized just as one of the slots 58 passes off the edge of the section 21. This assumes, of course, that the lamp 48 is sending a beam of light through the slots 55, 56 and 57. At the receiving station the speed of the belt 104 is such that the several slots 105 pass any given point during the time interval required for the corresponding number of the slots 75 to pass the given point. The movements of the belts 74 and 104 are synchronized for this purpose. The gearing at the receiving station is so arranged that the slots 91 in the wheel 90 pass downwardly at a point adjacent to the lens 108 at a rate of speed which is related to the rate of speed of the cylinder 54.

Any number of slots 91 may be made in the wheel 90, but it is essential that whatever be the number the slots must travel at such a rate of speed that each of them traverses a distance represented by the virtual length of the slot 105 during the time interval required for a group of slots 55, 56, 57 and 58 upon the cylinder 54 to pass in succession the respective sections 18, 19, 20 and 21; that is to say, each section 18, 19, 20 and 21 should have each of its selenium coatings illuminated once while the wheel 90 travels far enough to enable one of its slots 91 to pass downwardly a distance represented by the height of a slot 105. It is obvious, therefore, that the gearing of the several movable parts may be varied considerably, provided the time relations above described be duly allowed for.

The frequency of the currents flowing through the wires 82, 82ª and energizing the primary winding 81 is independent of the frequency of the pulsations passing over the main line and should be sufficiently high to render continuous the glow from the lamp 87. It will be understood in this connection that the light from a vacuum tube or in fact from practically any other sort of electric lamp has a certain degree of persistency and continues for an instant after the cessation of each current pulsation. This continuous glow is for some purposes aided further by the persistence of vision; but independent of the persistence of vision it may have the effect of rendering the emission of light from the lamp practically constant under normal conditions.

The action of my device is as follows:— Suppose that an image represented by a picture is to be transmitted. It is placed in front of the lens 78 as indicated by the legend "object" in Fig. 1. The image would now be defined upon the face of the selenium cell 17 in much the same manner that it would be defined upon the screen in a camera, except for the fact that the selenium cell 17 is for the most part hidden by the belt 74. The entire image is therefore not formed all at the same time upon the selenium cell 17. Only so much of the image as is represented by the length and the width of a slot 75 makes its appearance at any one moment. The selenium cell is therefore illuminated by a vertical line or beam of light substantially co-incident with a slot 75, but varying in intensity at different points along its length according to the portions of the image fragmentarily represented by it. Such being the case, the conductivity of the various portions of the selenium coating 15 is varied in this sense that a series of imaginary points located vertically in a line have their respective ohmic resistances varied by the action of the light upon the selenium coating. At the same time that the vertical beam of light is passing horizontally across the selenium cell 17, the cylinder 54, by its revolution, causes the several slots 55, 56, 57 and 58 to pass the respective sections 18, 19, 20 and 21 as above described, and as the intensity of illumination of the lamp 48 is constant, the several longitudinal coatings 32 of selenium each receive in succession the same degree of illumination. Hence, they merely serve to control the uniform flow of the electric current, and the revolution of the cylinder 54 relatively to the sections 18, 19, 20 and 21 is analogous to the action of a switch. Suppose, now, that a particular point upon the coating 15 of the selenium cell shown in Fig. 4 happens, because of the definition of the image upon it, to be illuminated by a spot of light, representing, I will say, the light reflected from some luminous point in the image. It is clear that this point of illumination remains always in the same position, and that it must be thrown intermittently upon the selenium coating 15 but always occupies the same position thereupon. Let us suppose, for the sake of simplicity, that this point of light falls upon that portion of the selenium coating 15 immediately over the two conducting strips 13, 14. As a matter of fact, there being a large number of these conducting strips, and they being disposed very close together, almost any spot of light or almost any shadow, however small, will traverse a large number of them. Indeed for clearness of outline it is essential that all of the conducting strips of the cell 17 be made as thin and arranged as closely together as possible. Let us suppose further for the sake of illustration that above and below the single point of light just referred to the image is of such character as to represent a total lack of light. The illustration may, perhaps, be rendered clearer by supposing that the point of light is a single star in a portion of the sky. The rotation of the cylinder 54 in causing light to be thrown through the slots 55 upon the several coatings 32 is unable to cause any electrical current to flow through either of the selenium cells, except when the beam of light through the slot 55 falls upon the particular coating 32 covering the particular strips 29, 30, leading to the strips 13, 14 upon which the spot of light is falling. Under the conditions just described the following circuit is completed: Battery 23, wire 24, wire 27, strips 28, 29 through their selenium coating, wire 33, strips 13, 14 through the portion of the selenium coating 15 covered by the light spot, wire 34, strips 30, 31 through their selenium coating 32, wire 39, wire 42, primary winding 43, and wire 44 back to the battery 23. This momentarily energizes the primary winding 43 and causes it to act inductively upon the secondary winding 45, thus sending a momentary alternating current over the line 47, the intensity of the current varying by the resistance of the circuit just traced and being proportionate to the intensity of the light spot thrown upon the selenium cell 17.

Owing to the synchronization of the movable parts at the receiving and transmitting stations, the alternating current controlled by the light spot passes over the line 47 at the exact instant when the slot 75 of the receiving apparatus occupies a position corresponding to that of the light spot at the transmitting station, this position being reckoned, we will say, from a given edge or corner of the cell 17, and at the same instant when the slot 91 of the relay 90 is in a position representing the position of the light spot upon the cell 17 as reckoned, we will say, from another edge or corner of this cell. In other words, the vertically disposed slot 105 of the belt 106 and the horizontally disposed slot 91 of the relay 90 cross each other at a definite point having a spatial relation corresponding to the position of the light spot upon the cell 17. At the instant just described the light of the lamp 87 necessarily undergoes a change. Normally this lamp has a definite and constant degree of illumination produced as follows: An alternating current passes through the wire 82, primary winding 81 and wire 82 back to the source of supply. This causes the primary winding 81 to act inductively upon the secondary winding 85, thereby causing the lamp to be illuminated, as will be readily understood. At the precise instant when the momentary alternating current is sent over the line 47 as above described, the primary winding 81, acting under this impulse, energizes the winding 85 independently of the supply of current through the wires 82, 82ª, and thus causes light from the lamp 87 to undergo variations in intensity, these variations being analogous to the changes produced at the transmitting station by the action of the light from the image upon the selenium cell 17. Following the particular instances of the light spot, as above described, we will see that the light of the lamp 87 becomes momentarily brighter at the instant when the alternating current impulse is sent over the line 47. The fact that the line has a condenser 79 is immaterial, for the reason that alternating current impulses can readily be sent through a condenser. The lamp 87 thus giving a certain flush of light at the particular instant when the slots 91 and 105 occupy the proper relative spatial relation a light spot is produced momentarily upon the screen 109. The rotation of the movable parts following the cycle of operations just described causes the spot in question to be reproduced again and again with such great rapidity that its appearance to the eye is continuous. If the existence of the light spot upon the screen 109 is not in fact continuous this is compensated by the natural phenomenon known as the persistency of vision. Having explained how a spot of light is transmitted and reproduced, it is easy to see that a black spot or a part not illuminated in the image to be transmitted will produce upon the screen 109 a dark spot of the same shade. It is also easy to see that the entire image to be transmitted may be considered as made up of spots or squares several hundred to the inch measured in either direction, and consequently the image when reproduced may have as much action and delicacy in tone as is the case with a so-called half-tone engraving or photograph. It will also be seen that the relative size of the image reproduced may be controlled altogether by focusing the objectives or lenses.

While the lamp 48, the revoluble cylinder 54 and related parts constitute a type of switch which is controllable by light, I do not limit myself to this kind of switch. The apparatus shown at the right of Fig. 2 is essentially a switch and I mostly prefer the switch controllable by light, for the reason that its movements can readily be made sufficiently rapid without undue wear. Neither do I limit myself to the particular arrangement of any of the other parts shown either at the receiving station or at transmitting station.

I do not limit myself to the use of any particular part shown at either the transmitting station or the receiving station, nor to any particular form of conductor for connecting the stations. Neither do I limit myself to the use of a condenser in the main line.

Having thus described my invention, I claim as new and desire to secure by Letters Patent:—

1. The combination of a light-controlled cell, a belt movable relatively thereto and provided with a slot, means for defining an image upon said belt and upon so much of said cell as is left exposed by said slot, a light-controlled switch for shifting an electric current to different parts of said light-controlled cell for the purpose of enabling the light passing through said slot to said cell to produce variations in said electric current, a line wire energized by said variations of said current, and mechanism controllable by said currents passing through said line wire for the purpose of reproducing at a distance an image simulating that thrown upon said belt and said light-controlled cell.

2. The combination of a line wire, means for impressing thereupon electric impulses analogous to variations in the light of an image, an electric lamp controllable by variations of current in said line wire, a movable belt disposed adjacent to said lamp and provided with a slot, a movable wheel disposed adjacent to said lamp and provided with a slot crossing said slot in said belt, means for moving said belt and said wheel in planes crossing each other so as to direct the movements of a beam of light passing from said lamp through said slots thus crossed, and a screen for receiving said beam of light thus controlled.

3. The combination of a pair of synchronizing motors, one disposed at a receiving station and the other at a transmitting station, a light-controlled cell and a light-controlled switch disposed at said transmitting station and connected with the synchronizing motor at said transmitting station, a line connected with said light-controlled cell and with said light-controlled switch for conveying to a distance electric impulses produced by the conjoint action of said light-controlled switch and said light-controlled cell, and mechanism connected with said synchronizing motor at said receiving station for reproducing an image.

4. The combination of a line wire, means for energizing the same by electric currents, the intensity of said currents representing the relation between lights and shadows of an image to be transmitted, a vacuum tube located at the receiving station and adapted to be energized by said currents from said main line, and means for energizing said vacuum tube to a predetermined normal extent independently of said currents from said main line.

In testimony whereof I have signed my name to this specification in the presence of two subscribing witnesses.

SIDNEY ROTHSCHILD.

Witnesses:
WALTON HARRISON,
EVERARD B. MARSHALL.